(No Model.)
R. R. & C. B. DARLING.
FRESH WATER FILTER.
No. 499,284. Patented June 13, 1893.
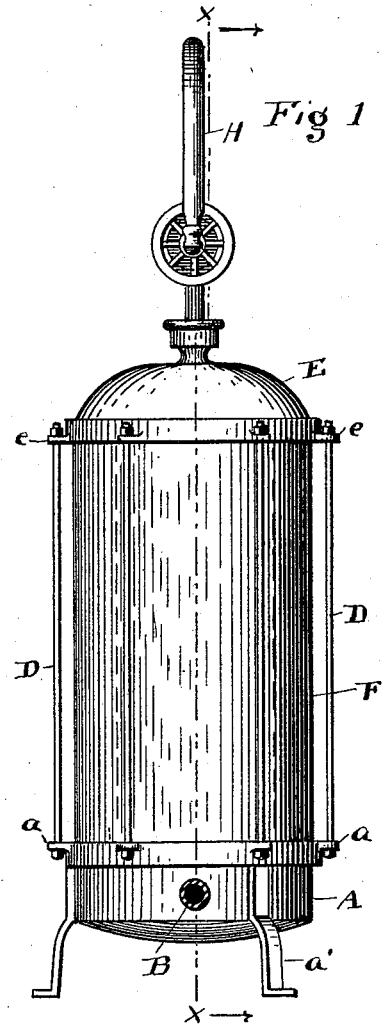
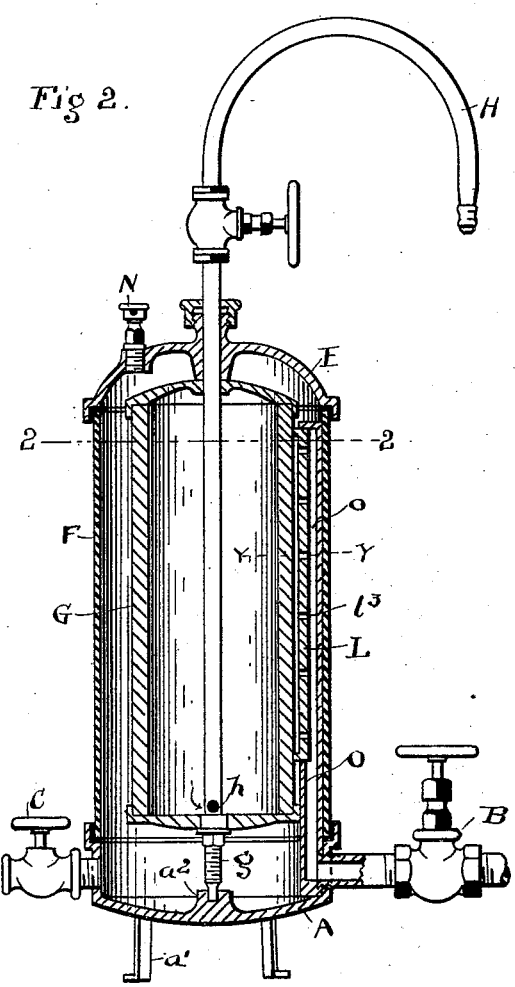
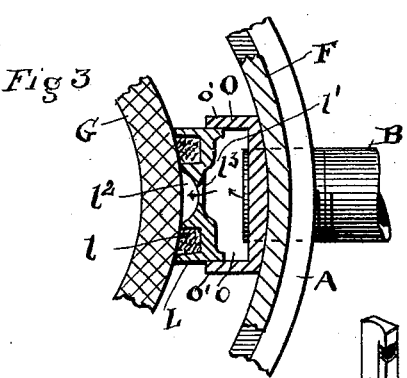
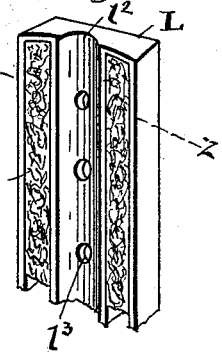
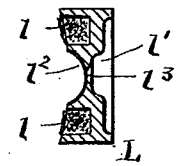
ATTEST
R. B. Moser.
Georgia Schaeffer.
INVENTORS
Rolla R. Darling
Cornelius B. Darling
By H. J. Fisher
ATTORNEY

UNITED STATES PATENT OFFICE.

ROLLA R. DARLING AND CORNELIUS B. DARLING, OF CLEVELAND, OHIO.

FRESH-WATER FILTER.

SPECIFICATION forming part of Letters Patent No. 499,284, dated June 13, 1893.

Application filed November 7, 1892. Serial No. 451,150. (No model.)

*To all whom it may concern:*

Be it known that we, ROLLA R. DARLING and CORNELIUS B. DARLING, citizens of the United States, residing at Cleveland, in the county of Cuyahoga and State of Ohio, have invented certain new and useful Improvements in Fresh-Water Filters; and we do hereby declare that the following is a full, clear, and exact description of the invention, such as will enable others skilled in the art to which it appertains to make and use the same.

Our invention relates to fresh water filters, and the invention consists in the construction substantially as shown and described and particularly pointed out in the claims.

In the accompanying drawings, Figure 1 is a plain elevation of our new and improved filter, and Fig. 2 is a vertical central sectional view substantially on line $x$, $x$, Fig. 1. Fig. 3 is a cross section of a fragment of the filter, say on a line corresponding to $y$, $y$, Fig. 2. Fig. 4 is a front perspective view of a fragment or portion of the cleansing or abrading strip or piece detached from the other parts, and Fig. 5 is a cross section thereof, say on line $z$, $z$, Fig. 4. Fig. 6 is a perspective view of a modification of the cleansing strip as hereinafter fully described.

A represents the base of the filter, with an inlet pipe and cock B and an outlet or waste cock C. This base is in the form of a cap and provided about its top edge with perforated ears $a$ for the tie rods D, and is shown as having legs $a'$ to support the filter. But the legs may be dispensed with and the filter otherwise supported, and an annular flange may take the place of ears $a$. These are mere structural details which can be largely varied.

E represents the cap of the filter, provided with ears $e$ or their equivalent, for the passage of the rods D at the top.

F is a glass or other equivalent transparent cylinder, resting at its ends within the overlapping and packed flanges of the base and cap, respectively, and rigidly tightened therein by the tie rods D.

The filtering cylinder G is supported within the cylinder F by means of a suitable spindle or journal $g$ at its lower end, resting in a cavity or other suitable bearing $a^2$ in or upon the bottom A, and by the discharge or delivery pipe H at its upper end. The said pipe H has an opening $h$ at its lower extremity for the inlet of water, and passes centrally through the top of the filtering cylinder G and the cap E of the inclosing case of the filter, in both of which caps the said tube is secured against the escape of water about its surface. The said discharge pipe H is made rigid with the inner cylinder either at top or bottom or both, so that the neck or bent part thereof may be used as a lever or handle to turn the filtering cylinder when it is to be cleansed. This filtering cylinder may be made of any material or combinations of material that will produce a satisfactory filtering body.

The medium for cleansing the surface of the cylinder may be water alone or water and the abradant combined. If combined, the arrangement of the parts is such that the abradant and the water act conjointly on the same part of the surface at the same time, thus obtaining the advantage of the joint action of these elements in the cleansing operation. To secure this result we construct a cleaning or abrading device consisting of the metallic plate, strip or piece L, having longitudinal recesses or channels on its face on opposite sides of its center, in which the abrading material $l$ is placed. This material may be ground emery, or other equivalent firm material. The said plate or piece L has also a central longitudinal groove or depression $l'$ in its rear, and a corresponding groove, depression or channel $l^2$ in its front along the line of perforations, and perforations or water passages $l^3$ at intervals between its ends and between front and rear grooves $l'$ and $l^2$. The abrading material need not be deep in the plate L nor extend up beyond the face thereof, because the said material is very firm and durable and not liable to be soon worn or ground away by contact with the filtering cylinder. Hence, the edges of the said piece L may come practically against the said cylinder when the abradant is at work and yet allow the abradant and the water room to do all the work required. The said piece or strip L is placed loosely in the vertical flanged support O, shown in cross section in Fig. 3, and secured in any good way to the inside of the outer cylinder G. In this flanged guide support the said piece L is adapted to fit snugly at its sides, so that the joint is practically water-tight, and a water passage way o is provided from the inlet pipe B into the support O behind the plate L, as seen in Fig. 1.

In the top of the outer cylinder E is shown a screw plug N which is removed or opened when the water is drawn off from the filter, and the cleansing of the filtering cylinder takes place and a suitable air valve or inlet may be employed in lieu of the plug N.

The operation of the filter is obvious from the foregoing description. To cleanse the same the first thing to do is to open the escape valve C slowly and to leave it open, and then close the inlet valve B at the back of the filter. Thirdly, open the vent plug or valve N at the top of the filter so as to admit air and permit the water to escape freely from the filter. Then, when the water has been drawn off, close air valve N open the valve B and turn the filter cylinder around three or four times, as the condition thereof may require, and then let the filter stand a few moments to carry off the dirty water. This completes the operation of cleansing, and then all the parts should be restored to their normal condition. That is, the plug or valve C should be closed and the valve B opened to fill the cylinder. In this operation it is important to note that the plug or valve N is closed before filling the filter begins, and as the opening h in the goose neck discharges tube H is at the bottom of the filtering cylinder, the air that is in the filter necessarily is confined therein, because it has no means of escape. It occurs, therefore, that when the water pressure is on at its maximum, the atmosphere will be crowded to the top of the respective cylinders and fill a space indicated, say, by line 2, 2, though this space may be greater or less than thus indicated, according to the water pressure. This confined air serves an important function in a device of this kind, because the moment the outlet valve $h'$ is opened to draw water, the air confined within the cylinders exerts an expansive pressure which shows itself in the free flow of the water from the pipe H, and this occurs though the valve B remains closed, and will continue until the atmospheric pressure becomes insufficient to force the water out of the said pipe. We may in this way draw a quart or more of water from the filter without opening the inlet valve, and the atmospheric pressure will also co-operate with the water pressure if said valve B be opened when the drawing of the water occurs. It is, therefore, desirable always to maintain an air cushion as described in the top of the filter. If the air should gradually be exhausted, the filter should be discharged and cleansed and the conditions just named be restored, so that a good atmospheric pressure may again be had in the filter. We claim, also, a very material advantage in our construction and arrangement of parts whereby the part L is supported and operated. Thus, it will be seen that the said part is adapted to slide back and forth within the flanges or sides $o'$ of the box or support O in which it is held. Of course, this sliding movement is, in any event, very slight and hardly perceptible, (but in this invention it is exceedingly material and important because it makes the device L practical. For example, it is very desirable to have the part L constantly pressed against the filtering cylinder, so that it will abrade or wear upon the surface thereof, if the said cylinder be turned.)

It occurs in the practical use of these filters that the goose neck H is liable to be turned many times in the course of a day, back and forth, and the filtering cylinder, of course, turns at the same time. Hence, if an abrading pressure were upon the part L all this time, it would not be long before the comparatively thin and susceptible filtering cylinder would be worn away; but it so occurs that when the cock C is closed and the filter is full of water under pressure, the pressure against one side of the part L is equal to the pressure against the other side, and hence, there is nothing to force the said part against the said cylinder, and hence, also, when the said cylinder is turned, the said part L naturally yields to any slight back pressure and the two parts thus become at last so separated that the abrading or scouring of the cylinder ceases. The water pressure or spring, or cushion, or whatever it may be termed, which becomes available for cleaning the filtering cylinder is therefore avoided when the filter is in use, and only is exerted and utilized when the filter is being cleaned. We have found also that the part L, or its equivalent, can be utilized with great advantage without the abrading material therein or thereof, and we have shown in Fig. 6 another form of device which can be substituted for the part L and serve a very excellent purpose. In this Fig. 6 the said part S is adapted to the rounded surface of the cylinder as is the part L, but is hollow and has longitudinal slits or slots s on its inside instead of perforations. As before described the water from the supply enters this box and is discharged through the slits therein on its face against the surface of the cylinder, and when the said cylinder is revolved in cleansing, as hereinbefore described, the force of the water discharged in this way against its surface is such as to be very effective in cleaning the cylinder. A similar effect substantially is obtained by the device L without the abrading material.

A further advantage in this structure is the cleansing power exerted from the inside of the filtering cylinder. When the water cock C is opened the normal water pressure being stored in the atmosphere within said cylinder, there is set up a counterflow of water through the pores of said cylinder, and this helps very materially to clean not only the surface of the cylinder but the pores thereof.

We deem the transparent outer cylinder F an important element of the invention, because without it no one can tell when the filtering cylinder needs cleaning, unless they remove the cap. But with a glass or like outer cylinder, the condition of the inner cylinder is always disclosed and one can tell at a glance when it requires cleaning as well as when it is cleaned.

Having thus described our invention, what we claim as new, and desire to secure by Letters Patent, is—

1. In a water filter a filtering cylinder and a plate or strip held in contact with said cylinder by water pressure, substantially as described.

2. The filter herein described having a filtering cylinder adapted to be rotated, and abrasive material pressed against the same by water under pressure, substantially as described.

3. The outer cylinder and the inner cylinder, and a water space between said parts open to the supply pipe, and a movable part or piece resting against the inner cylinder and held against the same by pressure of the water in said space, substantially as described.

4. In a water filter the main casing and the filtering cylinder supported at its ends therein, in combination with an abrasive piece in contact with said filtering cylinder having a water passage through it, and a support for said piece provided with a water passage from the water inlet, substantially as described.

5. The main casing for the filter having the glass cylinder forming the body thereof, in combination with the filtering cylinder supported at its ends to be rotated, and abrasive material between said cylinders pressed against the filtering cylinder by water pressure, substantially as set forth.

6. In a water filter, the main casing and the filtering cylinder, in combination with a device in said casing constructed to direct water under pressure against said filtering cylinder and said device held against the filtering cylinder by water pressure, substantially as set forth.

7. A filter as herein described having water inlet and outlet valves and an air inlet valve, in combination with a vertically arranged cleansing device formed with water passages, and a water chamber behind said device adapted to contain water under pressure to press said device against the filtering cylinder, substantially as set forth.

8. The filter having a casing as herein described, the filtering cylinder supported at its ends in the said casing and a discharge tube forming the upper bearing for said cylinder, in combination with an abrading strip having water passages arranged vertically between the casing and said cylinder, and a chamber in which said strip is supported and adapted to move back and forth in respect to said cylinder, said chamber adapted to contain water under pressure from the main, substantially as set forth.

Witness our hands to the foregoing specification this 1st day of November, 1892.

ROLLA R. DARLING.
CORNELIUS B. DARLING.

Witnesses:
H. T. FISHER,
RICHARD MOSER.